Patented July 28, 1942

2,291,262

UNITED STATES PATENT OFFICE 2,291,262

STABILIZATION OF PARASITICIDES

William P. ter Horst, Packanack Lake, N. J., assignor to United States Rubber Company, New York, N. Y., a corporation of New Jersey No Drawing. Application January 31, 1941, Serial No. 376,858

4 Claims. (Cl. 167—24)

This invention relates to stabilization of parasiticidal preparations such as insecticides, fungicides, and the like.

It is known that insecticides such as that commonly known as Derris powder which is made by grinding Derris root (*Derris elliptica*) rapidly deteriorates upon exposure, for example to sunlight, oxygen, ozone, or a combination of them. The deterioration is accompanied by corresponding loss in insecticidal or parasiticidal effectiveness, which necessitates spraying or dusting or other application of the insecticide at frequent intervals. The same light-deteriorating characteristics are true of other fungicides and insecticides, such as Derris resinate, rotenone and similar rotenoid principles, timbo root (*Lonchocarpus urucu*), cube root (*Lonchocarpus utilis*), pyrethrum flowers, phenothiazine, and others. Generally, such properties are exhibited by plant insecticides which contain rotenone and rotenoid principles, the latter term designating parasiticidal principles of the same plants which are not exactly identical with rotenone chemically, but have a similar insecticidal action. This deterioration takes place also when extracts of the described roots are used instead of the ground roots.

The present invention relates particularly to the stabilization of insecticides and fungicides which are subject to deterioration as by light. It has been found that a suitable stabilizing agent has the formula

where $n$ is 2 or 3, and X is hydrogen or metal, of which a preferred example is the compound having the formula

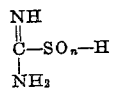

where $n$ is 2 or 3, particularly where $n$ is 2. Formamidine sulfinic acid (in which $n=2$) may be prepared by oxidation of thiourea (J. Boeseken; Proc. Acad. Soc. Amsterdam 41—1938). These compounds are themselves known to be effective parasiticides.

The present invention accordingly provides compounds in which the active plant extract insecticide or other parasiticide is stabilized, particularly against light, and the stabilizer further acts as an augmenting insecticide. The stabilizers, therefore, according to this invention have the two-fold function of, first, retarding deterioration by exposure of the essential insecticide, and, secondly, of acting as an additional insecticide.

The tests tabulated below illustrate the usefulness of the invention, as where the parasiticidal preparation is exposed to light and oxygen.

Plants (nasturtium) were sprayed on a turntable making 15 revolutions per minute. The various insecticides were sprayed onto the plants for 30 seconds (15 seconds up, 15 seconds down). The spraying pressure was 25 pounds per square inch. The test organisms were black bean aphids (*Aphis rumicis*). Mortality was determined 24 hours after spraying.

Toxicity tests were made before and after exposure of the various stabilized and unstabilized insecticides. Light exposure was effected by holding the test material at a distance of 18 inches from the bulb of a 900 watt mercury vapor sun lamp. The test samples were thoroughly mixed at frequent intervals during the exposure period.

As the essential insecticide, water dispersions containing one pound of ground Derris root, having 5% rotenone, were made up with 200 gallons of water.

The results were as follows:

| Time of exposure of insecticide to sunlamp_____hours__ | 0 | 18 | 36 |
|---|---|---|---|
| Insecticide | Mortality | | |
| | Per cent | Per cent | Per cent |
| None_____ | 4.1 | | |
| Untreated Derris_____ | 56.4 | 42.0 | 33.0 |
| Derris plus 5% of formamidine sulfinic acid_____ | | 53.7 | 41.4 |
| Derris plus 5% of thiourea_____ | | 38.3 | |

This table shows the effectiveness of the new stabilizer on light-sensitive plant insecticides. By use of the new stabilizer, deterioration of the Derris root during 18 hours' exposure to the sunlamp was substantially inhibited, and its deterioration after 36 hours' exposure was substantially no greater than that of untreated Derris which had been exposed only 18 hours. On the other hand, the addition of thiourea actually appeared to aggravate the deterioration of the Derris root.

Preparations of other than 5% stabilizer based on essential insecticide by weight may be used, depending upon the type of insect and climatic conditions and on the particular essential insecticide ingredient.

The stabilizer may be added preferably prior to or during the grinding of the Derris root or other essential plant insecticide although it may instead be added after grinding, care being taken to effect an even mixture. Derris powder usually functions as a contact insecticide or as a repellent, whereas the stabilizer appears, besides stabilizing, to function mainly as a stomach poison or as a repellent. Excellent results have been obtained with combinations of Derris resinate (extract) and formamidine sulfinic acid (stabilizer), and likewise with combinations of rotenone and formamidine sulfinic acid, as mothproofing agents for textiles, thus rendering them highly resistant to weathering, also as a livestock spray and as a household disinfectant.

Where the hydrogen in the above formula is replaced by metal, to form metal salts, any metal such as ammonium, sodium, potassium, calcium, magnesium, zinc, iron, copper, lead, mercury, cadmium, silver, aluminum, etc. may be used.

The preparations disclosed herein may be used in the form of sprays or dusts as well as in combinations with inert materials, other insecticides, fungicides, or auxiliary ingredients such as wetting agents, spreading agents, sticking agents, dispersing agents, and other materials.

Having thus described my invention, what I claim and desire to protect by Letters Patent is:

1. A parasiticide preparation comprising a parasiticide having an active ingredient selected from the class consisting of rotenone and rotenoid principles, and a stabilizer therefor comprising a sulfino-formamidine compound selected from the group consisting of formamidine sulfinic acid and the metal salts thereof.

2. A parasiticide preparation comprising a rotenone-containing parasiticide and a stabilizer therefor comprising formamidine sulfinic acid.

3. An insecticidal preparation comprising Derris root and a stabilizer therefor comprising a sulfino-formamidine compound selected from the group consisting of formamidine sulfinic acid and the metal salts thereof.

4. A parasiticidal preparation comprising Derris root and as a stabilizer therefor formamidine sulfinic acid.

WILLIAM P. TER HORST.